(12) United States Patent
Persaud

(10) Patent No.: US 12,021,479 B1
(45) Date of Patent: Jun. 25, 2024

(54) ECO POD

(71) Applicant: Leon Persaud, Towaco, NJ (US)

(72) Inventor: Leon Persaud, Towaco, NJ (US)

( * ) Notice: Subject to any disclaimer, the term of this patent is extended or adjusted under 35 U.S.C. 154(b) by 23 days.

(21) Appl. No.: 18/124,240

(22) Filed: Mar. 21, 2023

(51) Int. Cl.
*H02S 10/40* (2014.01)
*H02J 7/35* (2006.01)

(52) U.S. Cl.
CPC ............... *H02S 10/40* (2014.12); *H02J 7/35* (2013.01)

(58) Field of Classification Search
CPC ....................................................... H02S 10/40
See application file for complete search history.

(56) References Cited

U.S. PATENT DOCUMENTS

| | | | | |
|---|---|---|---|---|
| 2014/0116870 A1* | 5/2014 | Kamen | ..................... | E04H 3/02 202/83 |
| 2018/0069416 A1* | 3/2018 | Brace | ....................... | F03D 9/00 |
| 2020/0304056 A1* | 9/2020 | Carrington | .............. | H02S 30/20 |
| 2021/0107369 A1* | 4/2021 | Lojek | ..................... | H02J 7/0029 |
| 2023/0188082 A1* | 6/2023 | Kuropas | ................. | B60L 53/53 320/101 |

FOREIGN PATENT DOCUMENTS

| CA | 3177898 A1 * | 12/2021 | .............. B60L 53/30 |
|---|---|---|---|
| DE | 202017101098 U1 * | 4/2017 | |

OTHER PUBLICATIONS

English machine translation of DE-202017101098-U1 (Year: 2023).*

* cited by examiner

*Primary Examiner* — Angelo Trivisonno
(74) *Attorney, Agent, or Firm* — Leon Persaud

(57) ABSTRACT

The current invention proposes a novel form of container that requires no electricity and can produce and work on solar energy to provide various facilities to users including but not limited to solar charging stations, cellular connectivity, docking stations, related software and smart application, accessories rooms and automated lockers.

6 Claims, 6 Drawing Sheets

ECO POD

BACKGROUND

Field of the Invention

The present invention relates to a kind of solar energy equipment, specifically, relate to a kind of solar energy-powered container providing multiple advancements to its users.

Description of the Related Art

Many nations of the world, including the United States, places a high importance on finding renewable energy sources that will eliminate or at least mitigate dependence on fossil fuels. Indeed, according to one report by the Frankfurt School UNEP Collaborating Centre for Climate & Sustainable Energy Finance, global investment in renewable energy increased by 17% in 2011 to an all-time high of $257 billion. According to the same report, the total investment in solar power increased by 52% to $147 billion in 2011.

Although is it agreed that renewable energy systems are important, the implementation of such can be difficult. For example, commercial wind farms can be inefficient and take up valuable acreage. Commercial solar farm's also take up land that could otherwise be used for farming, land development, or biodiversity. Most of the common renewable energy systems include fixed, permanent energy generation units. For example, most solar parks use ground mounted arrays. These units cannot be moved from the general location to optimize energy production based on fluctuating environmental conditions, to temporarily turn over the land for other uses, or to allow for mobile energy production.

Additionally, most wind energy systems are expensive and inconvenient. Many developing countries, although strongly interested in renewable energy, lack the means and infrastructure for putting large areas of land in energy production. Likewise, installing renewable energy systems in remote locations can be difficult if not impossible. Even residential renewable energy systems, for example, roof solar panels, are costly and can be unattractive and intrusive.

There are multiple inventions that have been proposed in prior art regarding bringing advancement and enhanced utility of using solar energy and making our environment better and clean for future generations. However, the utilization of these systems in daily life is quite cumbersome and non-effective. Also, the features of these utility systems are quite limited.

The instant invention attempts to overcome deficiencies of the prior art by providing a solar-powered container structure that provides multiple advancements including but not limited to solarpowered housing, solar-powered charging stations, cellular connectivity, charging ports for solar-chargeable vehicles, and so on.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

The primary object of the invention is related to the system for portable energy generation systems that may be installed in remote locations, temporary locations, and mobile locations in a cost- and space-effective manner.

It is a further objective of the invention to provide a portable container having an outer surface and an inner surface and defining an internal space, and one or more solar energy generation assemblies.

It is a further object of the present invention to provide a new and improved assembly that is of durable and reliable construction.

An even further object of the present invention is to provide a new and improved solar power system that may further provide charging stations for vehicle's and device's.

It is also the objective of the system to provide a solar-powered shipping container that requires no electricity and fulfills all of its requirements through a solar energy system.

It is moreover the objective of the system to include a kit for the production of electricity which may include a substantially hollow and portable container, at least one solar energy generation assembly, at least one internal frame, at least one solar tracking assembly, at least one battery, at least one power inverter, at least one charge controller, and attachment components, also being able to fit within the container.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way.

Other features, aspects, and advantages of the subject matter described herein will become apparent from the following detailed description, figures, and claims.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
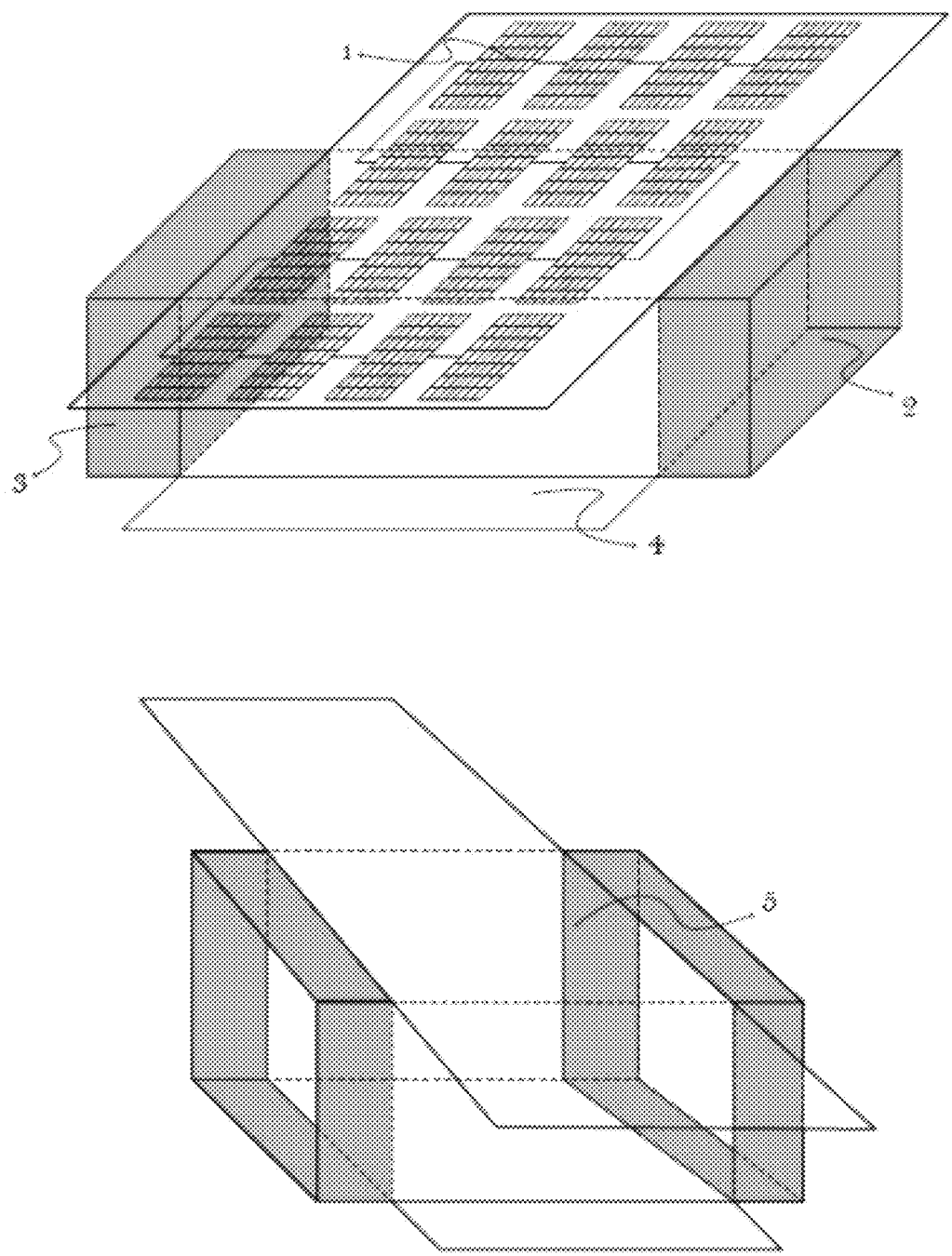
FIG. 01 structural layout view of the claimed assembly as per preferred embodiments of the invention.
1) Solar Array
2) Utility/System Control Room
3) Accessory Room
4) Access Ramp
5) Unit Ecopod FIG. 02 power design and power generation system as per preferred embodiments of the invention.
5) E-Bike's (mountain bike)
6) Docking Station/Kiosk Payment
7) Docking Station Lock and Charging FIG. 03 another view of the claimed assembly as per preferred embodiments of the invention:
2) Utility System Control Room
8) Battery Bank
9) Inventor/Charge Controller
10) Utility Twish Lock/Knife Switch/Generator Port 11) Computer Server Rack
12) AC & Heating System's
13) Main AC Electrical Panel
14) Remote Access Panel/'GPS' or StarLink
15) EarthCam/Weather Station/RF Base Station/BDA/
16) Remote Door Actuator System
17) Security Camera System with Remote Access
18) Fire Arrest System/Alarm FIG. 04 perspective view of the claimed assembly as per preferred embodiments of the invention:
3) Accessory Room
19) Automated Locker System
20) Vending Machine
21) First Aid Station
22) RF Radio Communication Access Point
23) Accessory Room Door's FIG. 05 perspective view of the claimed assembly as per preferred embodiments of the invention:
24) Glass Display Window
25) LED/TV Display
26) Opposite Side Window of Container in Eco Pod
Figure 2:
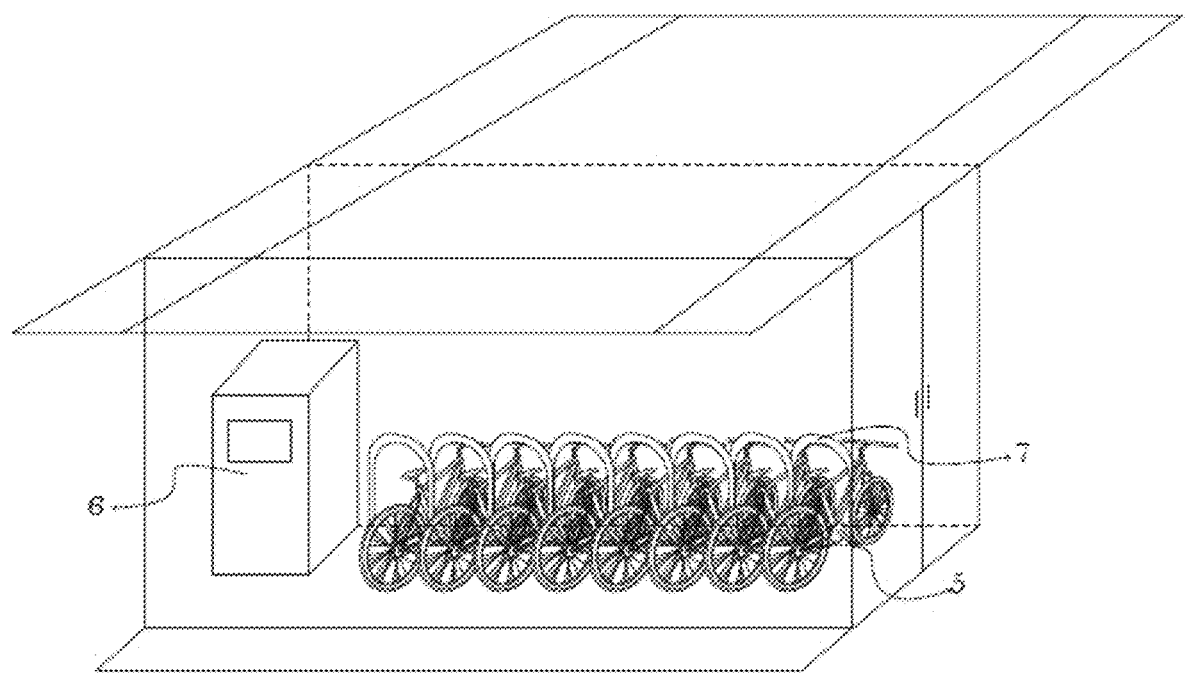
Figure 3:
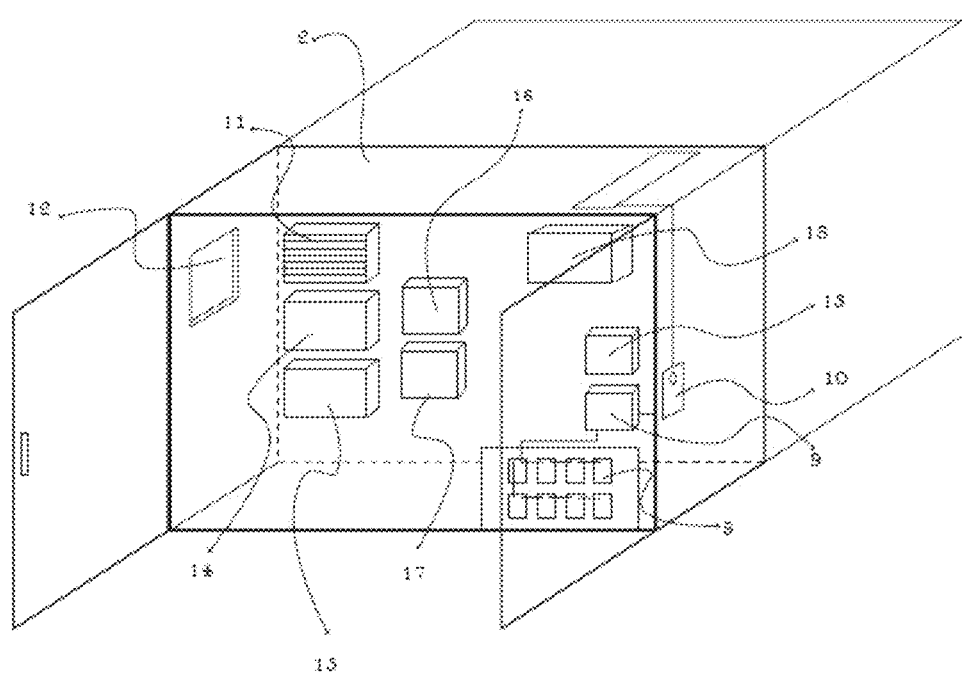
Figure 4:
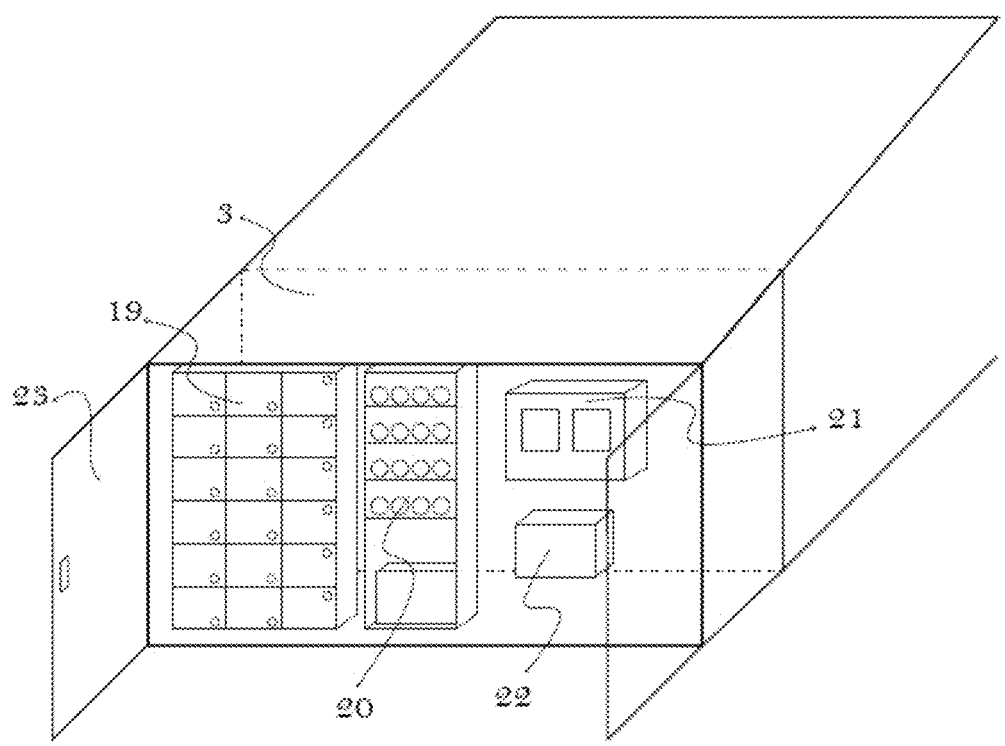
Figure 5:
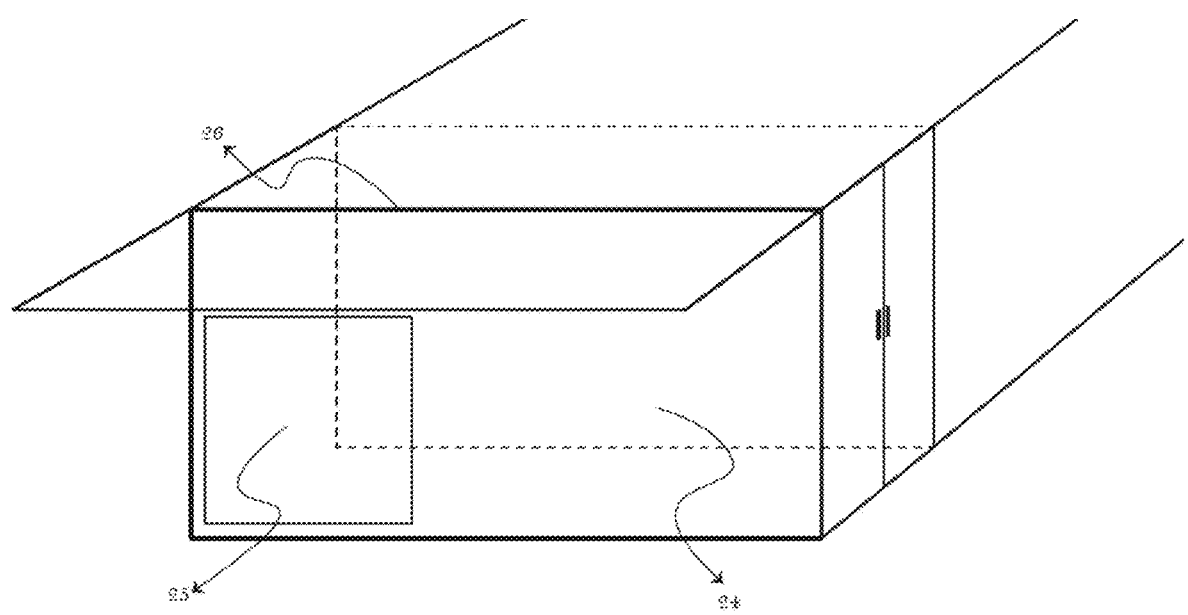
Figure 6:
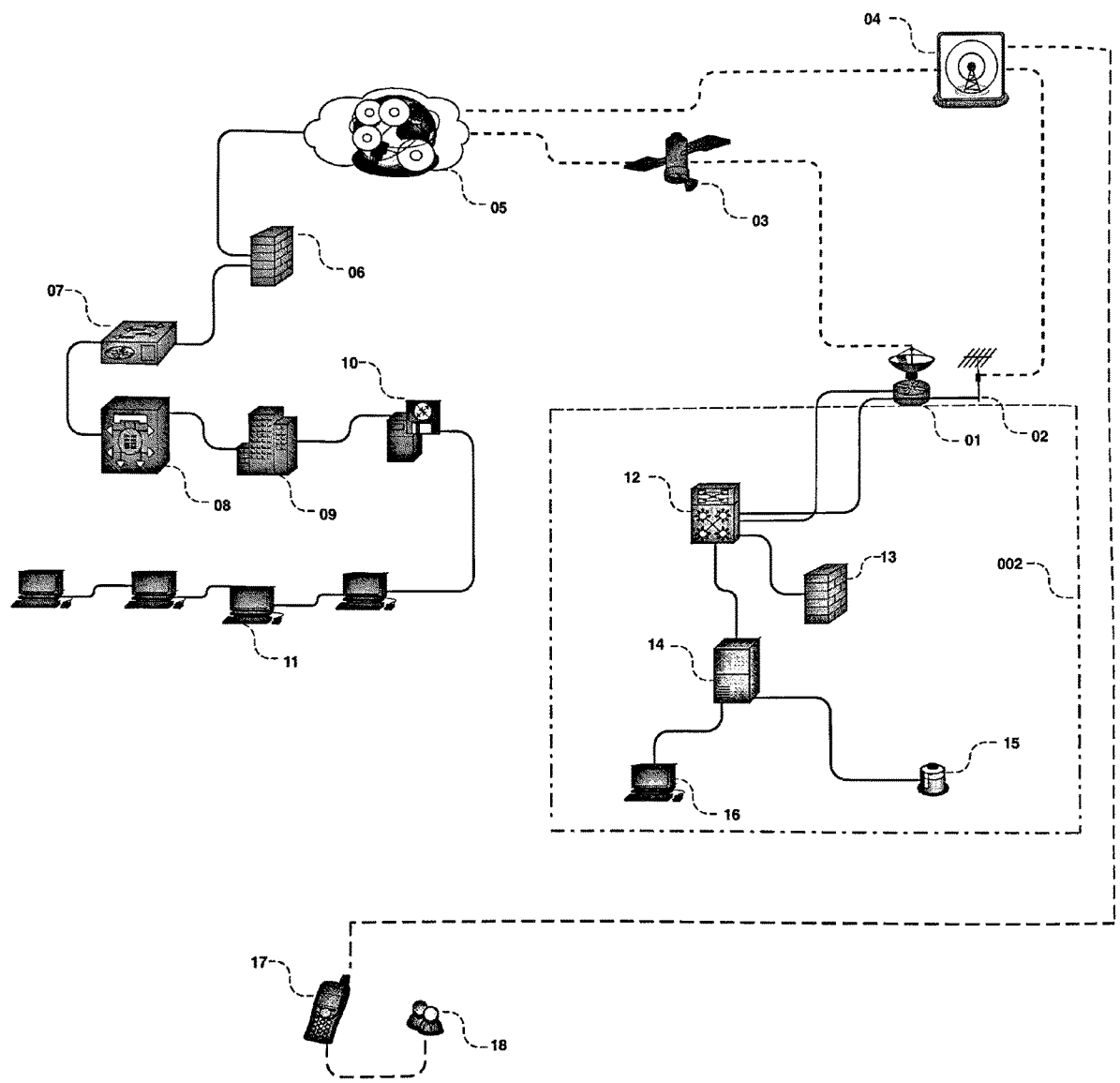
FIG. 06 shows the wireless access infrastructure of the claimed assembly as per preferred embodiments of the invention:
27) StarLink
28) LTE 5G Antenna
29) Satellite (StarLink)
30) Wireless LTE hub
31) Internet (cloud)
32) Firewall
33) Server
34) Head End
35) Customer Service Center
36) Eco Pod Central Software
37) User Interface/Customer Service Portal
38) Router
39) Firewall
40) Network Switch & all networkable components in Eco Pod Utility System Control Room
41) Network, UPS
42) Control Point/PC
43) Smart Phone Application (APP)
44) End-User The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Moreover the EcoPod is capable of selling its unused power to the utility grid. The Eco Pod is also capable of using power from the utility grid if needed however its only available if inter connection is available from utility.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

More specifically, the present invention as per its preferred embodiments is related to a container that doesn't requires electricity and can produce its own solar energy with its inbuilt solar production system.

As used herein, the term "solar energy generation assembly" generally refers to any device or combination of devices capable of directly or indirectly converting sunlight or solar heat into electricity. For example, a solar energy generation assembly may be a solar module, photovoltaic array, heliostat and predetermined target, solar thermal collector, or the like.

Referring now to FIG. 1, a first embodiment of a portable energy generation system is shown. The portable energy generation system may generally include a container, one or more solar energy generation assemblies, a ventilation system, an LED lighting system, a weather station, RF base station, a Fire arrest system, remote access panel, a power inverter, and an internal frame. The portable energy generation system may also include one or more batteries, a charge controller, one or more tracking assemblies, one or more user control devices, computers, or user input devices, sensors (such as temperature or pressure sensors), and/or wires or cables, conduits, and other components for anchoring, assembling, operating, monitoring, or linking the system.

The container may be any rigid-sided container that is sized to accommodate all the components of the portable energy generation system, including the one or more solar energy generation assemblies. As a non-limiting example, the container may be the typical size and shape of a shipping container, for example, approximately 40 feet in length by approximately eight feet in height and in width. Alternatively, other container sizes and configurations may be used, depending on the size and amount of components that must fit within, the method of transportation, and the area of the desired location at which the system will be assembled for use. The container may be camouflaged, labeled, and/or may have a textured, reflective, or non-reflective surface.

The portable energy generation system is transportable as a self-contained kit to the desired location. Once at the desired location, the portable energy generation system is assembled. The one or more solar energy generation assemblies are disposed on the outer surface of the container. Electrical components such as wires, power inverter, batteries, and charge controller may be housed within the container when the systems assembled, thus being protected from the elements, vandals, or other interference. Even with the electrical components being housed within container, a substantial volume of the container may be available for storage of other items or as temporary sleeping quarters or weather shelters.

Additionally, or alternatively, the at least partially empty container may be used to house other energy sources, such as gas or diesel generators, fuel cells, and batteries, to create a constant energy source even when no electricity is being generated by the one or more solar energy generation assemblies.

The assembly as per its further embodiments may include one or more solar energy generation assemblies may include any device or combination of devices capable of directly converting sunlight or solar heat into electricity. This includes, but is not limited to, photovoltaic cells, solar modules, solar thermal collectors, and so on.

The structure of assembly as per its further embodiments may include folding double doors for shipping container access, fiberglass/aluminum door, Ihook mobile drop, utility control room, aluminum access ramp, E-bike deck, front access door of aluminum/fiberglass, remote door activator, socket for vending machine and kiosk stations deck.

Although not explicitly shown or described herein, the portable Eco Pod system may be used for a variety of practical applications. As non-limiting examples, the system may be used as portable workshops or offices, medical stations or clinics (even including triage, emergency, or other facilities), refrigerated storage units for food, medicine, or other perishable items, public bathrooms, temporary or semi-permanent living quarters, pump stations for irrigation systems or the like, data storage units, electrical power source base units (for example, for powering emergency response equipment, cell phones, computers, etc.), and for any other purpose in which a portable and cost-effective energy source is required.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing detailed description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A solar-powered portable container system, comprising:
    a container with an outer and inner surface, the inner surface defining an internal space segmented into and consisting of three distinct sections;
    the three distinct sections comprising a first section on one end of the container, a second section on the other end of the container that is opposite to the first section, and a third section positioned between the first section and the second section, with each of the three distinct sections being in proximate and direct contact with the other sections;
    a solar energy generation assembly, comprising a set of photovoltaic panels and at least one solar tracking assembly, affixed to the top of the outer surface of the container;
    a software application integrated within the container system;
    the first section comprising, within its interior, electrical components including an inverter, a battery charge controller, and at least one battery;
    wherein the electrical components are configured to receive power from the solar energy generation assembly and from at least one other energy source when the solar energy generation assembly generates no electrical power output;
    the second section comprising, within its interior, at least one of a vending machine, an automated locker storage system, or a first aid station;
    the third section comprising, within its interior, a docking station configured to securely dock and to electrically charge a plurality of electric bicycles, and a kiosk payment system connected to the docking station,
    wherein the container comprises at least one remote door actuator system,
    wherein the container comprises a fire arrest system and alarm.

2. The container system of claim 1, wherein one of the sections is equipped with LED lighting systems.

3. The container system of claim 2, wherein one of the sections includes display monitors mounted within the container.

4. The container system of claim 3, wherein one of the sections is designed to support radio communication access.

5. The container system of claim 3, wherein the container is capable of selling its unused power to an external utility grid.

6. The container system of claim 5, wherein the container is also configured to receive power from an external utility grid when interconnection is available.

* * * * *